United States Patent [19]

Muralidhara

[11] Patent Number: 5,043,048
[45] Date of Patent: Aug. 27, 1991

[54] ELECTROMEMBRANE APPARATUS AND PROCESS FOR PREVENTING MEMBRANE FOULING

[76] Inventor: Harapanahalli S. Muralidhara, 2660 Sawmill Forest Ave., Dublin, Ohio 43017

[21] Appl. No.: 463,795
[22] Filed: Jan. 5, 1990

Related U.S. Application Data

[63] Continuation-in-part of Ser. No. 74,738, Jul. 17, 1987, abandoned.

[51] Int. Cl.$^5$ .............................................. B01D 17/06
[52] U.S. Cl. .................................. 204/186; 204/302; 210/748
[58] Field of Search ............... 204/302, 186, 252, 282, 204/283, 276, 180.1, 182.3, 130; 210/748

[56] References Cited

U.S. PATENT DOCUMENTS

| | | | |
|---|---|---|---|
| 2,571,247 | 10/1951 | Huebotter | 204/180 |
| 3,980,541 | 9/1976 | Aine | 204/186 |
| 4,032,454 | 6/1977 | Hoover et al. | 210/323 R |
| 4,057,479 | 11/1977 | Campbell | 204/258 |
| 4,100,068 | 7/1978 | Jordan et al. | 204/300 R |
| 4,224,135 | 9/1980 | Gidaspow et al. | 204/302 |
| 4,269,681 | 5/1981 | Watson et al. | 204/188 |
| 4,276,146 | 6/1981 | Coker et al. | 204/266 |
| 4,343,690 | 8/1982 | de Nora | 204/263 |
| 4,376,022 | 3/1983 | Porta et al. | 204/180 R |
| 4,421,579 | 12/1983 | Covitch et al. | 204/282 |
| 4,601,799 | 7/1986 | Froberger et al. | 204/181.8 |
| 4,604,174 | 8/1986 | Bollinger et al. | 204/301 |
| 4,617,128 | 10/1986 | Ostreicher | 210/679 |
| 4,620,917 | 11/1986 | Nozawa et al. | 204/302 |
| 4,707,229 | 11/1987 | Dempsey et al. | 204/283 |

FOREIGN PATENT DOCUMENTS

2567914 1/1986 France .

OTHER PUBLICATIONS

Electrokinetic Membrane Processes; Member Processes in Industry and Biomedicine; Milan Bier; Plenum Press; N.Y., London; 1971; pp. 233–266.
Members in downstream prcoessing; Minh S. Le et al.; The chemical Engineer; Jul./Aug. 1985; pp. 48–53.
Membrane Fouling Prevention in Crossflow Microfiltration by the Use of Electric Fields; R. J. Fields; R. J. Wakeman et al.; Chemical Engineering Science, vol. 42, No. 4; 1987; pp. 829–842.
Moulik, S. P.; *Physical Aspects of Electrofiltration;* 1971; pp. 771–776; Environmental Science & Technology.
Bier, Milan; *Electrophoresis as an Industrial Process;* 1971; pp. 84–21; Symposium 68th National Meeting of Chemical Engineers, Houston Tex.
Henry, Jr., J. D. et al.; *A Solid/Liquid Separation Process Based on Cross Flow and Electrofiltration;* 1977; pp. 851–859; AICHE Journal.
Radovich, J. M.; *Coupling Electrophoresis with Ultrafiltration of Improved Processing of Plasma Proteins;* 1980; pp. 1491–1497; Separation Science and Technology.
Yukawa, H. et al.; *Cross Flow Electro-Ultrafiltration for Colloidal Solution of Protein;* 1983; pp. 305–311; Journal of Chemical Engineers of Japan.
Bollinger, J. M. et al.; *Electrofiltration of Ultrafine Aqueous Dispersions;* 1984; pp. 54–58; CEP.

*Primary Examiner*—John F. Niebling
*Assistant Examiner*—Kathryn Gorgos

[57] ABSTRACT

An apparatus and method for continuously removing liquid from an aqueous suspension: the apparatus consists of a filter housing; an electrofilter disposed within the housing to provide a crossflow chamber and filtrate chamber within the housing; an inlet for supplying a suspension to the crossflow chamber and an outlet for removing a suspension reduced in liquid content from the crossflow chamber, both the inlet and the outlet may be disposed so as to provide a crossflow of the suspension across the surface of the electrofilter or disposed to provide a batch process with optional stirring; and an outlet for removing liquid from the filtrate chamber.

The method for continuously separating a liquid from an aqueous suspension while reducing membrane or filter fouling includes providing a crossflow apparatus having an electrofilter disposed therein; pumping the aqueous suspension into the crossflow apparatus at a pressure adapted to cause flow of filtrate through the electrofilter; and concurrently with pumping the suspension into the apparatus supplying electrical energy to the electrofilter at a voltage adapted to reduce fouling of the filter.

13 Claims, 10 Drawing Sheets

ELECTROMEMBRANE APPARATUS AND PROCESS FOR PREVENTING MEMBRANE FOULING

This is a continuation-in-part of application Ser. No. 07/074,738, filed on July 17, 1987, now abandoned.

FIELD OF THE INVENTION

This invention relates to an apparatus and a method for preventing membrane or filter fouling. The apparatus and method have utility in reducing the fouling problems associated with the use of filters and membranes to separate liquids and solids and in fractionation.

BACKGROUND OF THE INVENTION

Membrane processes have been applied to a wide variety of industrial separation processes for process schemes requiring either concentration or purification of aqueous streams ranging from clarification of juices, removal of products from fermentation broths and desalination of brackish waters etc. Some of the processes described above have been demonstrated on an industrial scale. This technology has been possible due to the development of new membranes which exhibit a high degree of hydraulic permeability coupled with ability to retain small molecules.

The membrane filtration process is, however, adversely affected by two phenomena, namely, concentration polarization and fouling. Concentration polarization is caused by the accumulation of solute molecules at the upstream surface of the membrane. This phenomena causes a reduction in the efficiency and of rate of the membrane filtration process. Concentration polarization is generally a hydrodynamic and diffusion phenomena.

Fouling also occurs with a variety of feeds including proteins and colloids. Fouling can be the result of an insoluble precipitate/particle or gel layer within the pores (plugging) or the result from build-up on the surface of the membrane itself. It has been reported in the literature that up to 100 micron thick gel layers can be formed over a period of 24 hours as a result of the denaturation of proteins. The presence of fat globules can also be responsible for formation of gel layers.

Such gel layers and plugging are responsible for decreases in membrane flux and, hence, affect product throughput and economics. Various methods of treating fouling and concentration polarization have been reported in the literature but have only had limited success in minimizing the problem. Some of these methods are heat treatment with pH adjustment, immobilized protease treatment and membrane scouring.

Some typical industrial applications of membrane separation in the food and beverage industry are removal of casein, fats and lactose from whey; clarification of liqueur and vodkas; sterilization of liquids, e.g. beer, wine; continuous microfiltration of vinegar; and concentration and demineralization of cheese, whey, soy whey and vegetable extracts. Other applications in the wastewater treatment industry include removal of cyanides from electroplating wastewaters; reuse of wastewater from ammunition manufacture; recovery and recycling of sewage effluent; and recovery of starch and proteins from starch factory waste, wood pulp and paper processing. Further applications are listed in an article by Minh S. Le et al, *The Chemical Engineer*, pp. 48–53, July/August 1985.

Previous work in this area includes the following U.S. Pat. Nos.: 2,571,247; 3,980,541; 4,032,454; 4,057,479; 4,100,068; 4,224,135; 4,269,681; 4,276,146; 4,343,690; 4,421,579; and 4,617,128.

Membrane separation techniques typical of the prior art include those that employ classical crossflow electrofiltration. Several good review articles that give an excellent background discussion include: Electrokinetic Membrane Processes, Milan Bier, *Membrane Processes in Industry and Biomedicine*, Milan Bier - Editor, Plenum Press, N.Y.-London, (1971) pp. 233–266; A Solid-/Liquid Separation Process Based on Cross Flow and Electrofiltration, J.D. Henry, Jr., et al, AICHe Journal, Vol. 23, No. 6, November 1977, pp. 851–859; Membrane Fouling Prevention in Crossflow Microfiltration by the Use of Electric Fields, R.J. Wakeman et al, *Chemical Engineering Science*, Vol. 42, No. 4, pp. 829–842, 1987. In classical crossflow electrofiltration the material to be filtered passes between a first electrode and a membrane or filter with a second electrode positioned on the other side of the filter. The electrodes are energized to pull suspended particles from the material to be filtered toward the first electrode and away from the filter. Thus the suspended particles cannot deposit on the filter or membrane.

Objects of the present invention include the enhancement of crossflow and dead-end electrofiltration by reducing energy requirements, improving filtration efficiency, reducing filtration time, reducing costly filter cleaning steps, and reducing filter fouling.

DETAILED DESCRIPTION OF THE INVENTION AND PREFERRED EMBODIMENT

Figure 1:
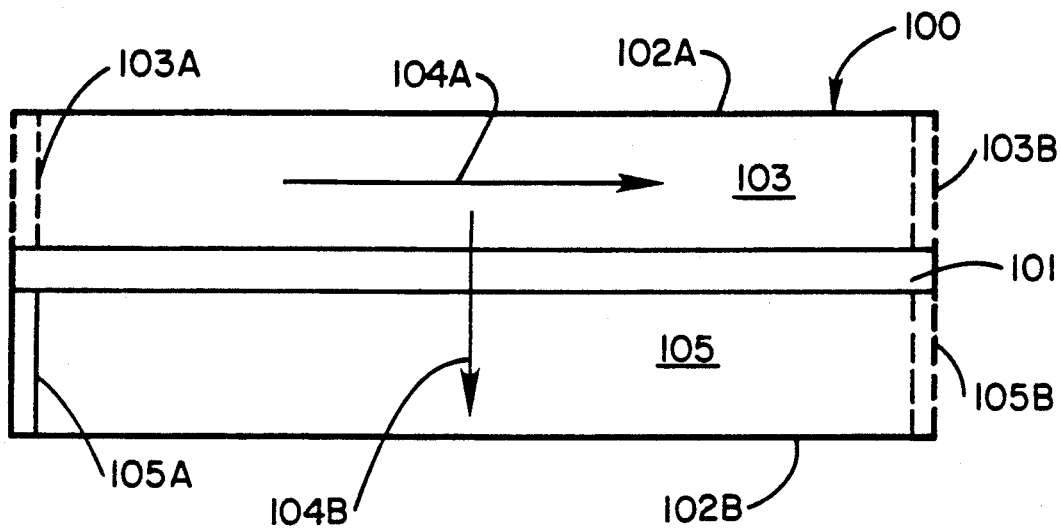
FIG. 1 is a schematic side view of a typical prior art crossflow apparatus.
Figure 2:
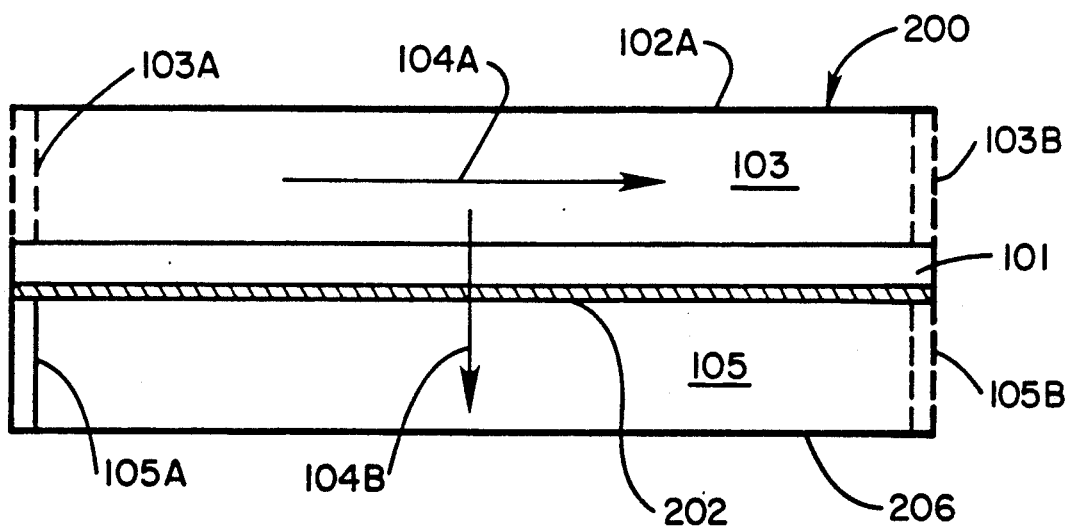
FIG. 2 is a schematic side view of another typical prior art crossflow apparatus.

The essential feature of the system is the unique arrangement of two electrodes to induce an electric field and an electric current across the filter system. The location of the electrodes is an important feature of the invention. FIGS. 1 and 2 illustrate two prior art electrodewatering arrangements that provided improved separation of solids and liquids.

The terms filter and membrane have their usual meanings as used herein. However, to facilitate discussion of the invention filter will be used to designate a filter or membrane and electrofilter to designate an electrofilter or electromembrane. Similarly, the invention is useful for slurries, solutions, and suspensions but the term suspension will be used herein and will be understood to include all types of liquid inputs. The term suspension is further defined to include macromolecules in solution, (e.g. proteins in water) and salts in solution (e.g. NaCl).

FIG. 1 is a schematic representation of a side view of a typical prior art crossflow apparatus 100. A filter 101 is located between two spaced apart electrodes 102A,102B. The slurry or suspension to be dewatered flows from inlet 103A through crossflow chamber 103, between electrode 102A and filter 101, as indicated by arrow 104A, and out through outlet 103B. Liquid in the slurry flows through the filter 101 as shown by arrow 104B into a filtrate chamber 105 to filtrate outlet 105B. 105A may be a wall or an inlet for additional liquid.

A variation of the prior art apparatus is illustrated schematically in FIG. 2 as apparatus 200. The electrode 202 on the filtrate chamber side of the filter 101 is placed adjacent to the filter 101. Electrode 202 is of course pervious to the filtrate. Wall 206 may form a boundary of chamber 105.

Figure 3:
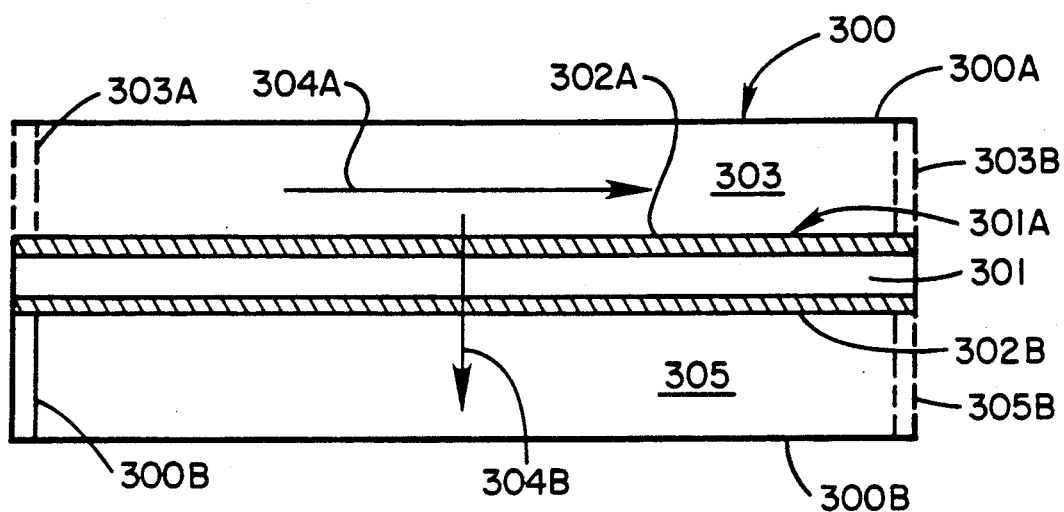
FIG. 3 is a schematic representation of one embodiment of the invention.
Figure 4:
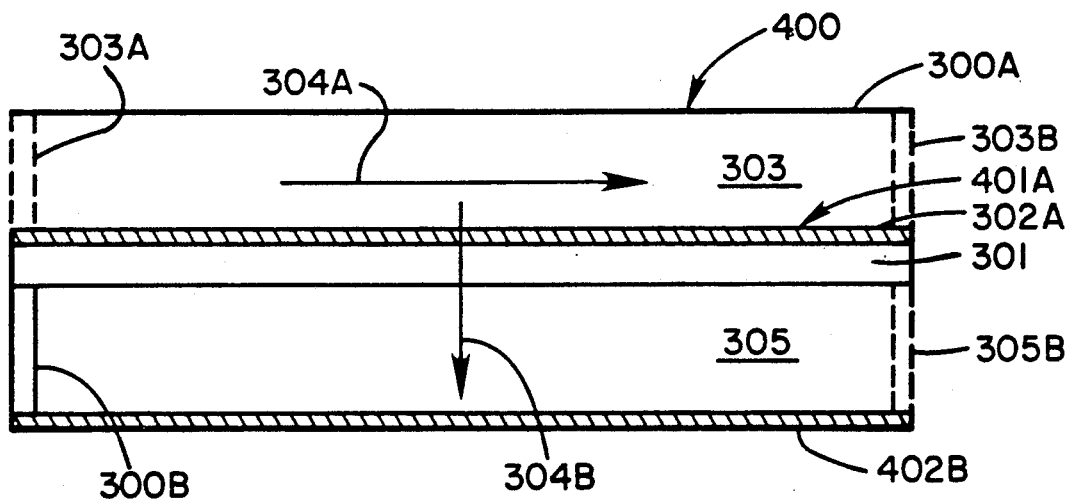
FIG. 4 is a schematic representation of another embodiment of the invention.

FIGS. 3 and 4 illustrate two modifications of the invention. In FIG. 3 the apparatus 300 includes a housing 300A,300B that has disposed within it an electrofilter 301A that divides the housing into crossflow chamber 303 and filtrate chamber 305. The filter is composed of a first electrode 302A, a filter (or membrane) 301 and a second electrode 302B. The electrodes 302A,302B may be integrally bonded to the filter 301 or only in physical contact therewith. A suspension is pumped into chamber 303 under pressure at inlet means 303A and flows across the electromembrane 301A in direction 304A. Filtrate flows through the filter 301A due to pressure in chamber 303 in the direction 304B and into filtrate chamber 305. Filtrate is removed at outlet means 305B. The portion of the suspension reduced in liquid content is removed at outlet means 303B.

FIG. 4 illustrates the alternate form of the invention. The apparatus 400 has most features in common with that of FIG. 3. However, electrofilter 401A now is composed only of a first electrode 302A and a filter material 301. The electrode 302A may be integrally bonded to the filter 301 or only in contact therewith. The second electrode 402B is now located away from the filter 301 and may form a portion of the walls of chamber 305.

A significant difference between the prior art and the present invention is obvious from FIGS. 1-4. In the prior art the suspension always passes between the electrode and the filter in the crossflow chamber. While in the invention the electrode in the crossflow chamber is always on the surface of the filter.

The present invention contemplates high rates of filtrate flow through the filter. This requirement is dictated by the need for high efficiency in this technology. The rate of flow will of course be dependent by the porosity of the filter selected for the application with low rates of flow associated with low porosity when extremely small particles are to be filtered. Filtrate flow rates for the filters will be above about 0.01 gallon/PSU/sq.ft. at the usual pressures encountered in the filtering art while filtrate flow rates above about 0.1 gallon/PSU/sq.ft. are better. While flow rates above about 1 gallon/PSU/sq.ft. are preferred. A typical filter for example would be rated above about 0.1 gallon/psi/day/sq.ft. Pressures normally encountered are up to 100 psi for filtration and ultrafiltration and up to 1000 psi for desolation processes. This is in contrast to other psi for such as in U.S. Pat. Nos. 4,707,229 to Dempsey et al. and U.S. Pat. No. 4,421,579 to Covitch et al., where high rates of flow such as those encountered in the filtering art would result in the apparatus being inoperative as an electrochemical cell.

Figure 5:
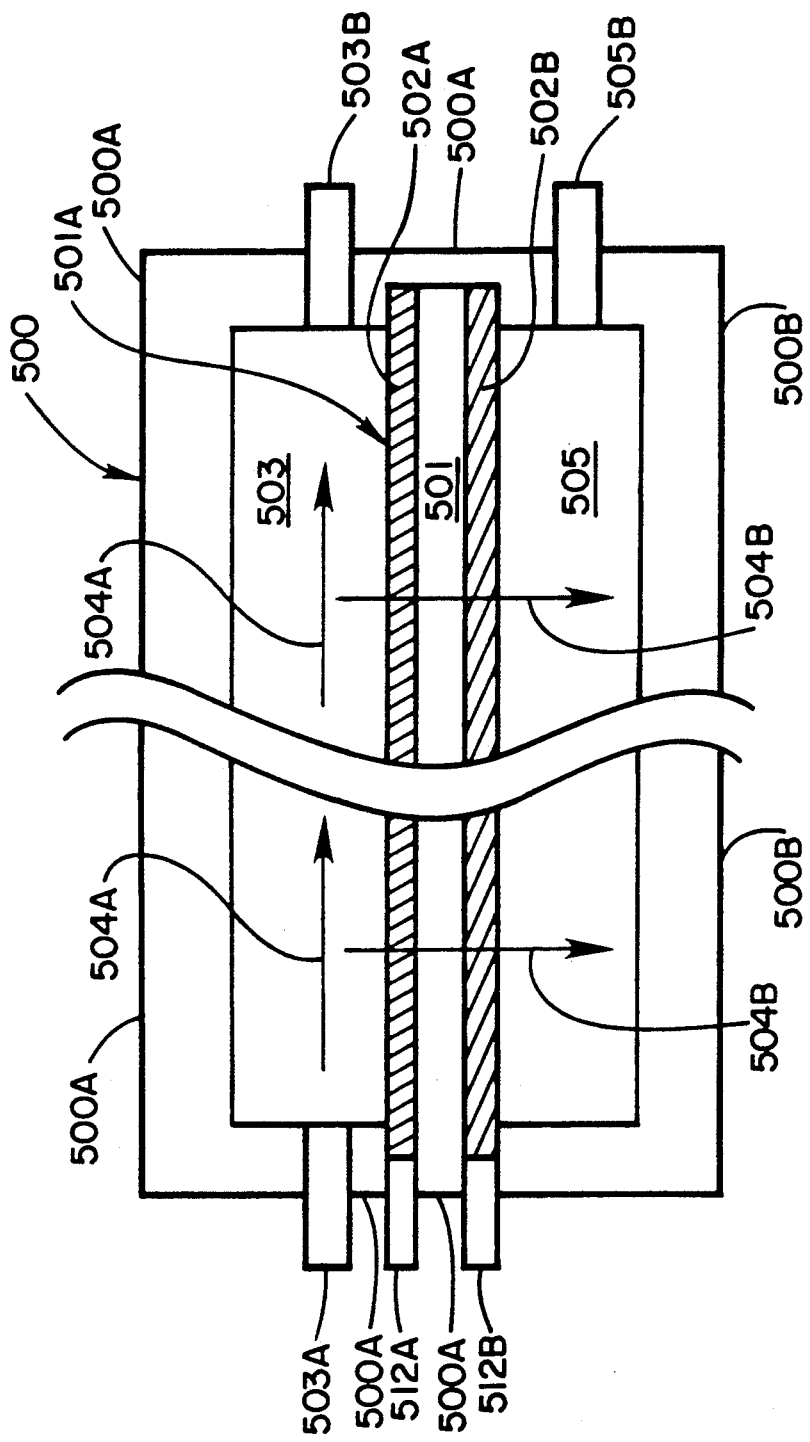
FIG. 5 is a detailed cutaway side view of the apparatus of the invention.

Referring to FIG. 5, the filter 500 comprises of a walled container (filter housing) 500A,500B that has disposed within it the electrofilter 501A of the invention that divides the volume within the walled container 500A into a crossflow chamber 503 and filtrate chamber 505. The electrofilter 501A comprises of filter 501 having an electrode 502A disposed on the surface that faces crossflow chamber 503. Another electrode 502B is disposed on the surface that faces chamber 505. Chamber 503 has an inlet end and an outlet end where connection is made with inlet means 503A and outlet means 503B respectively.

Figure 6:
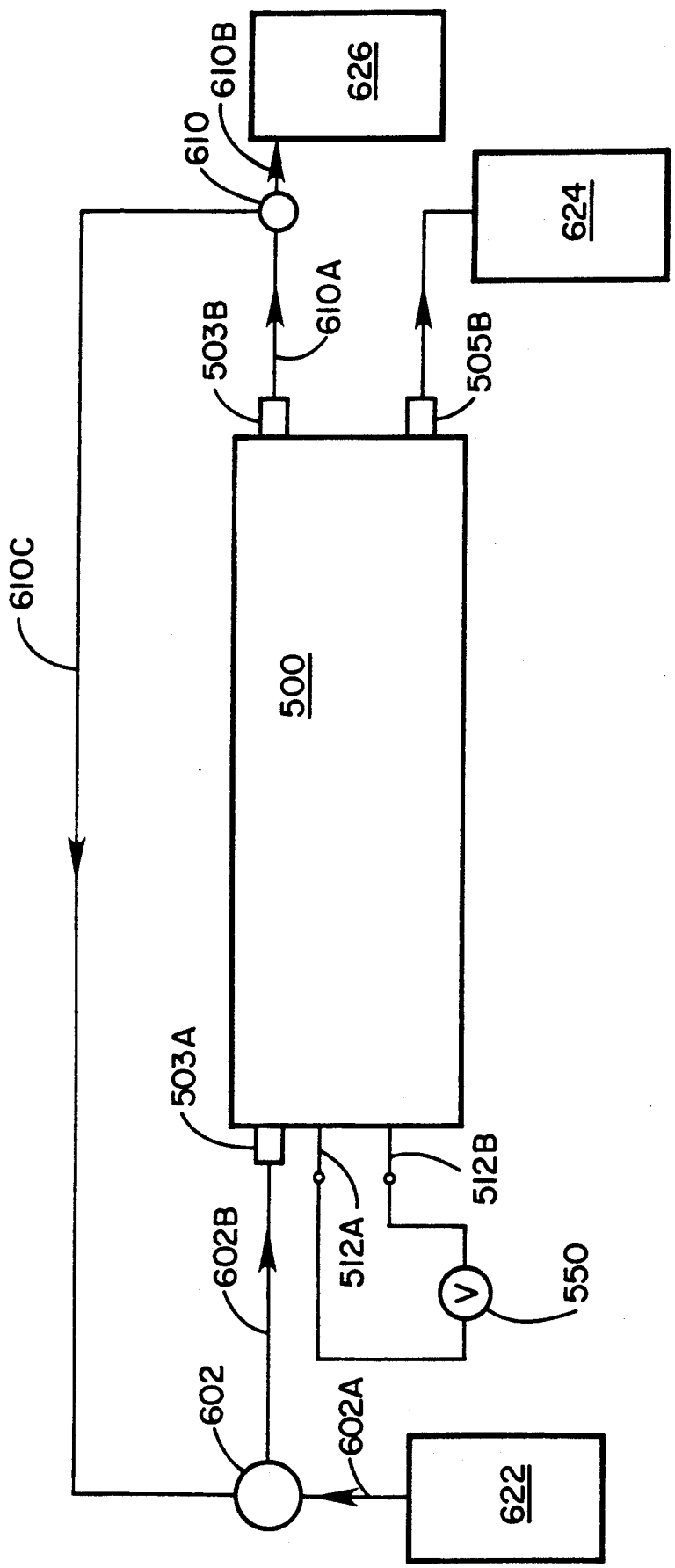
FIG. 6 is a detailed view of another embodiment of the invention showing connections for fluid flow.

A general description for the apparatus 500 for continuously removing liquid or fractionating from an aqueous suspension includes a filter housing 500A,500B; an electrofilter 501 disposed within the housing to provide a crossflow chamber 503 and filtrate chamber 505 within the housing; means 503A for supplying a suspension to the crossflow chamber 503 and means 503B removing a suspension reduced in liquid content from the crossflow chamber 503; both means may be disposed so as to provide a crossflow 504A of the suspension across the surface of the electrofilter 501 or disposed to provide a batch process with optional stirring means; and outlet means for removing liquid from the filtrate chamber. Electrical means 512A,512B are used for supplying electrical energy to the electrodes 502A,502B from electrical source 550 (FIG. 6). The electrofilter 501A is composed of a first electrode 502A, disposed on the crossflow chamber side of the filter 501 so as to be in contact with the membrane and a second electrode 502B is disposed on the opposite side of the filter. Included are means 503A for supplying a suspension to the crossflow chamber 503 at one end of the chamber and means to remove a portion of the suspension depleted in liquid from another end of the crossflow chamber 503, both means may be disposed so as to provide a crossflow 504A of the suspension along the first electrode and filter or disposed to provide a batch process with optional stirring means; and outlet means 505B for removing filtrate from the filtrate chamber.

The filtrate flows in the direction indicated by arrow 504B. When used as a continuous crossflow apparatus the apparatus 500 and electrofilter 501 are preferably elongated in the direction 504A so as to provide increased area and improved filtration.

Referring now to FIG. 6, the filter unit of the invention was used together with a pump 602, input reservoir 622, permeate reservoir 624, waste reservoir 626, and associated piping to perform experimental tests. In operation the suspension is pumped from input reservoir 622 through pipe 602A to pump 602 and thence through pipe 602B to inlet means 503A.

Pump 602 or similar pumping means is adapted to provide for increased pressure within the crossflow chamber 303 so that filtrate (permeate) 304B passes through the filter into the filtrate chamber. Sufficient pressure must be present to provide for filtrate flow and flow from the crossflow chamber at outlet 303B. The suspension concentrated in suspended material and depleted in liquid exits at outlet means 503B, by pipe 610A to valve 610 where all or at least a portion thereof may flow by pipe 610B to waste reservoir 626. Alternatively, all or a portion of slurry from valve 610 may flow by recirculator pipe 610C to pump 602 for mixing with slurry from pipe 602A. Control tests were performed by replacing the electrofilter with prior art filter designs as in FIGS. 1 and 2.

Figure 7:
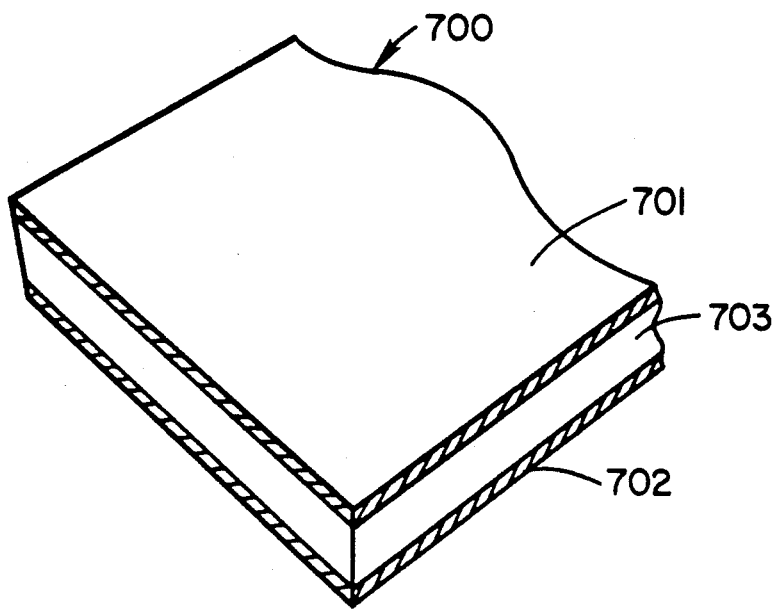
FIG. 7 illustrates one embodiment of the electrofilter of the invention where porous electrodes are adjacent to the filter.
Figure 8:
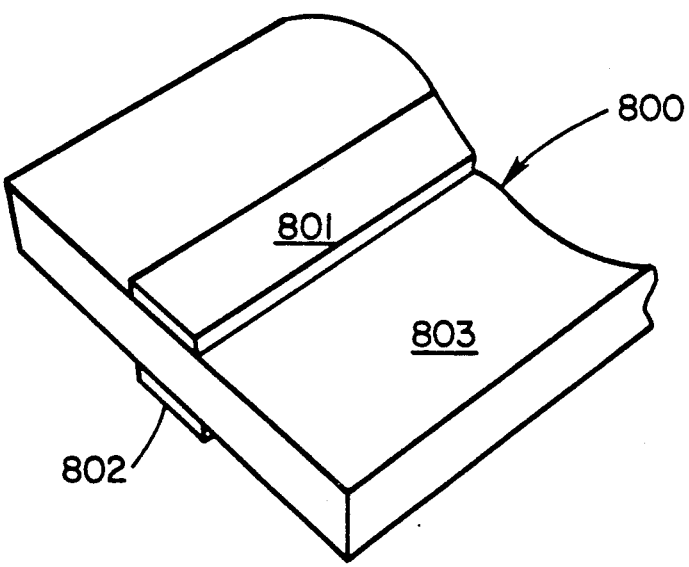
FIG. 8 illustrates another embodiment of the invention where a strip is used for each electrode.
Figure 9:
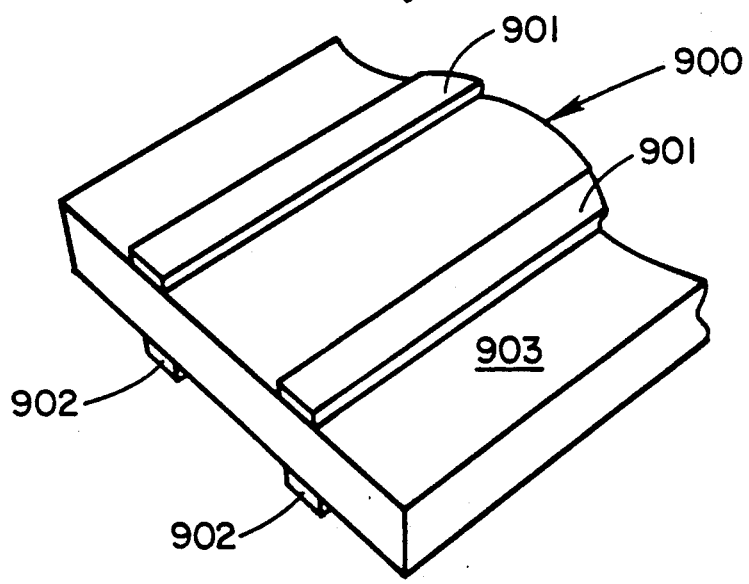
FIG. 9 illustrates another embodiment of the invention where two strips are used for each electrode.

FIGS. 7, 8, and 9 illustrate several variations in the design of the electromembrane or filter. FIG. 7 illustrates porous electrodes 701,702 that are disposed on both sides of the filter 703 of electrofilter 700. FIG. 8 illustrates the modification where a strip is used for each electrode 801,802 on filter 803 for electrofilter 800. This is the configuration used in the examples herein. FIG. 9 illustrates the modification for electrofilter 900 where a plurality of two or more strips are used for the first electrode 901 and the second electrode 902, that are disposed at opposite sides of filter 903.

Figure 10:
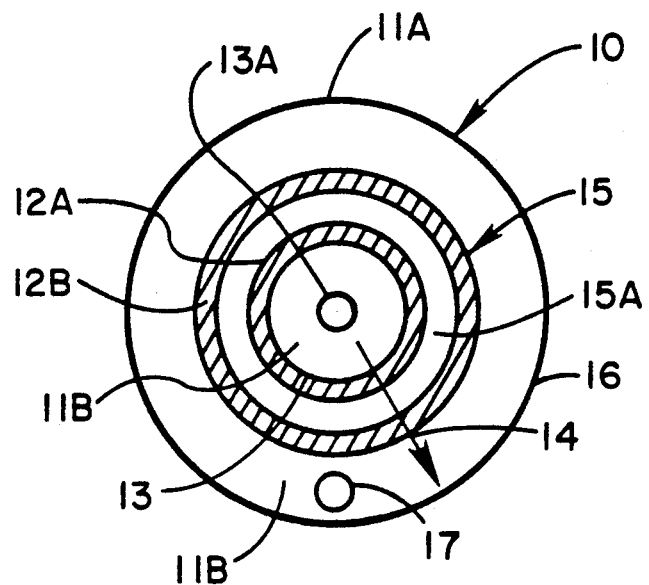
FIG. 10 and 11 illustrate further embodiments of the invention where the electrofilter is tubular.

FIG. 10 is a cutaway end view and illustrates the embodiment where the filter apparatus 10 is in the form of a cylinder or tube. Looking toward the inlet end of the apparatus 10 the tubular housing 11A and end housing 11B are seen. Housing 11B provides support for tubular layers and keeps them in position. Inlet means 13A admit a suspension into the cylindrical crossflow chamber 13 defined by first tubular electrode 12A and end housing 11B. The suspension flows up out of the drawing as viewed and out outlet means 13B (not shown) located oppositely to inlet means 13A. Tubular electrofilter 15 comprises electrode 12A and second tubular electrode 12B disposed on opposite sides of tubular filter 15A. Filtrate flows in direction 14 from crossflow chamber 13 to filtrate chamber 16. The filtrate chamber 16 is tubular and enclosed by housing 11A,11B and second electrode 12B. Filtrate may be removed at filtrate outlet means 17.

Figure 11:
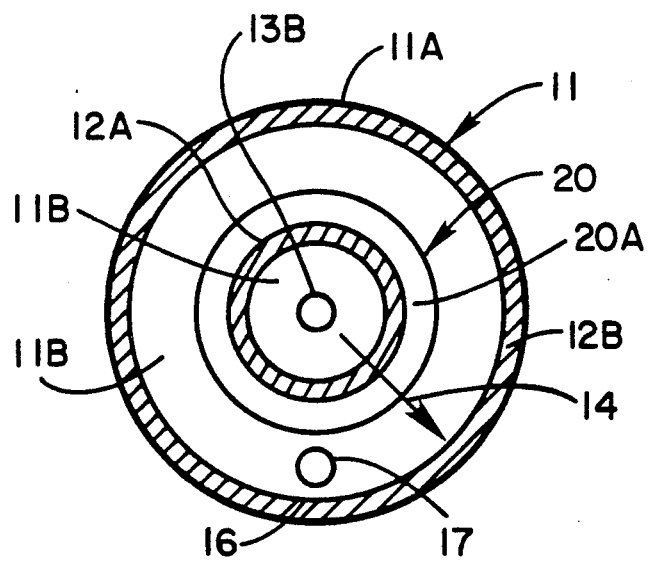

A modification of apparatus 10 is shown in FIG. 11 as apparatus 11. Where the second electrode 12B is now not in contact with the filter 20A. FIG. 11 is a cutaway end view of the apparatus viewed toward the crossflow outlet end. In operation the suspension enters at inlet means 13A (as in FIG. 10) not shown here and into the figure. The suspension reduced in liquid content is removed at outlet means 13B (as in apparatus 10). Filtrate moves from the cylindrical crossflow chamber defined by electrode 12A and end housing 11B through the electrofilter 20 into tubular filtrate chamber 16. The filtrate chamber 16 is defined by the surfaces of filter 20A, end housing 11B and second tubular electrode 12B. Housing 11A and 11B provide support for the tubular filter and electrodes. Filtrate may be removed at filtrate outlet means 17. The electrofilter 20 in this configuration is made up only of electrode 12A and filter 20A. In addition to the flat plate and cylindrical designs described herein spiral wound and hollow fibers with proper electrode placement may also be used.

Referring to FIG. 5, filter 501 may be composed of any typical filter or membrane materials that are essentially nonconductive. Typical filter materials include cellulose acetate, polyvinyl acetate, polysulfone, polyesters, composites, ceramics and sintered materials and the like. The electrode material can be gold, platinum, iridium coated materials and other insoluble metal electrodes. Microfiltration, ultrafiltration and reverse osmosis membranes and the like are all useful in the present invention when properly combined with electrodes to form an electrofilter. Electrodes 502A,502B may be in the form of strips, webs, electrodeposited layers, wires, and the like. Generally, only a low voltage in the range of 1½ to 100 volts is used to energize the electrofilter 501A depending on the properties of the suspension (pH, conductivity, salt content, etc.) and the properties of the filter. Electrofilter 501A uses only a small amount of current in operation in the order of 5 milliamps to several amperes. Therefore energy usage is typically 6-10 watts per square foot of membrane. This figure is very low and illustrates the economic advantages of the invention. Pressures usually used in the industry may be used with the electrofilter.

A Millipore Minitan ® unit with a membrane was used for the experiments set up as in FIG. 5. This type of unit allows testing of various arrangements of membranes. A peristaltic pump was used to draw fluid samples from an unpressurized reservoir. Each suspension sample was pumped through the Minitan ® unit in a crossflow arrangement at a constant flow rate. Concentrated material was returned to the input side and filtrate was collected in a separate reservoir. The area of a single membrane unit used in the examples below is about 60 cm$^2$. Two platinum strips were used as electrodes to produce an electric current across the membrane system. The location of the electrodes is an important factor as discussed herein.

EXAMPLE 1

Figure 12:
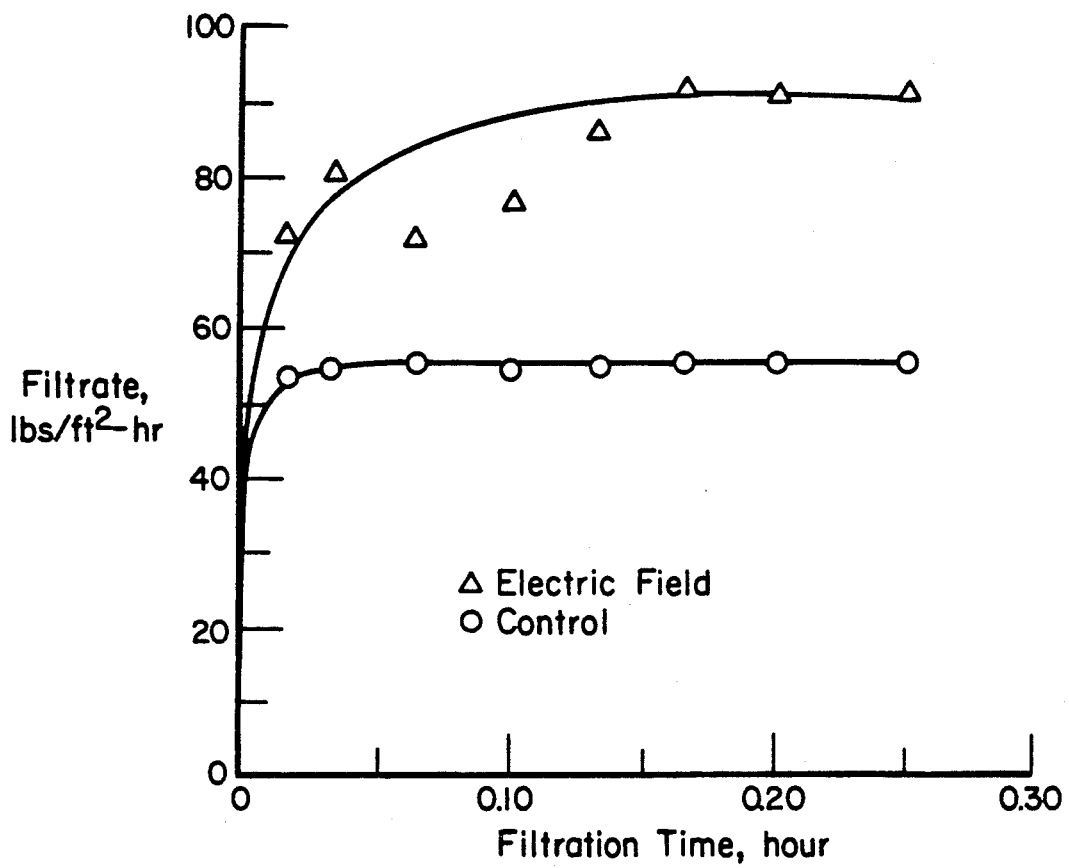
FIG. 12 and 13 are graphs showing the advantageous filtering of tap water by apparatus over a control.

Experiments were conducted with distilled water to obtain baseline flux data. FIG. 12 shows the results which indicate that in the presence of an electric field the flux can almost be doubled. Feed rate was 100 ml per hour.

Figure 13:
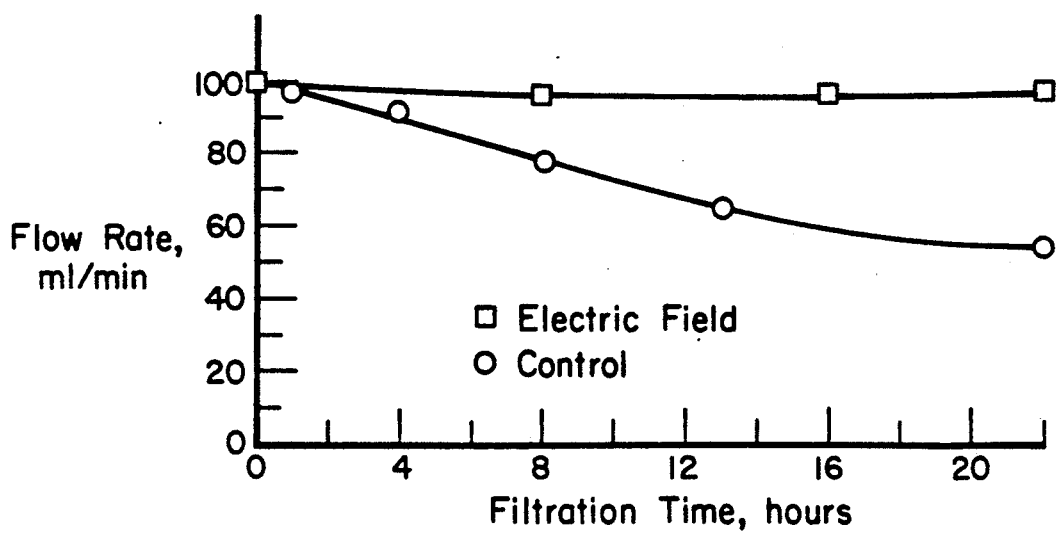

Longer duration results are shown in FIG. 13. The graph has been normalized for a 100 ml/minute flow rate. Initial pressure was 2 psi that increased to 25 psi when filtering using an electrofilter and 38 psi when filtering without the electrofilter. The configuration used for this latter experiment was similar that illustrated in FIG. 5 where the second electrode is in contact with the filter. This configuration gave significant results over the control as shown in the graph. Pore size of the membrane used as a filter was again 0.2 micron.

Zeta potential may be modified to some extent by additives such as salts that affect the ionic strength of the solution. Zeta potential appears to be inversely affected by ionic strength. As ionic strength increases the zeta potential decreases. In addition to changes due to changes in ionic strength, zeta potential can also be adjusted by varying temperature and pH. Generally, as the temperature increases the zeta potential tends to increase. Changes in zeta potential due to pH changes are more complicated and depend on the material.

EXAMPLE 2

A set of experiments were conducted as in Example 1 with tap water to determine the correct placement of the electrodes. Spacers were used to move the electrodes to various distances from the filter. Flow curves were plotted that indicated that the best results were obtained when the electrode on the crossflow side of the filter (the first electrode) was in contact with the filter. The placement of the electrode on the filtrate side (second electrode) was not critical and could be placed in contact with the filter or further away in the filtrate chamber.

In FIGS. 15 through 19 the flow rates for the experiments were normalized to allow easy comparison of results. This was done by dividing the initial flow rate into the subsequent flow rates for experiment tests and the control tests.

Figure 15:
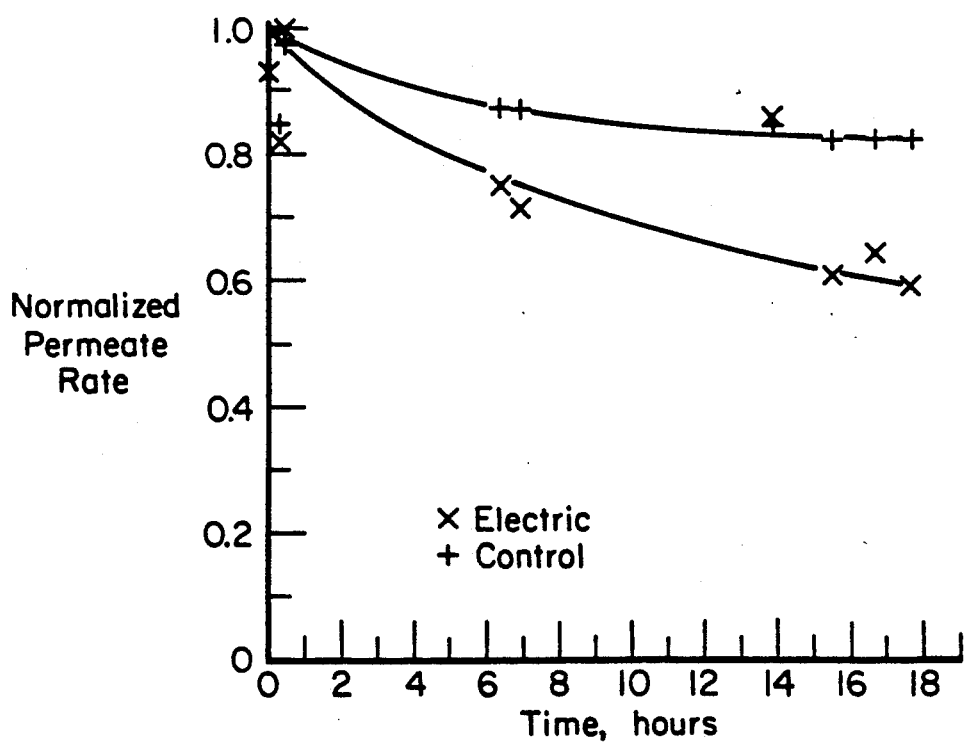
FIGS. 15 and 16 are graphs showing the effect on the normalized permeate (filtrate) rate when the electrode on the crossflow side of the filter is not in contact with the filter.
Figure 16:
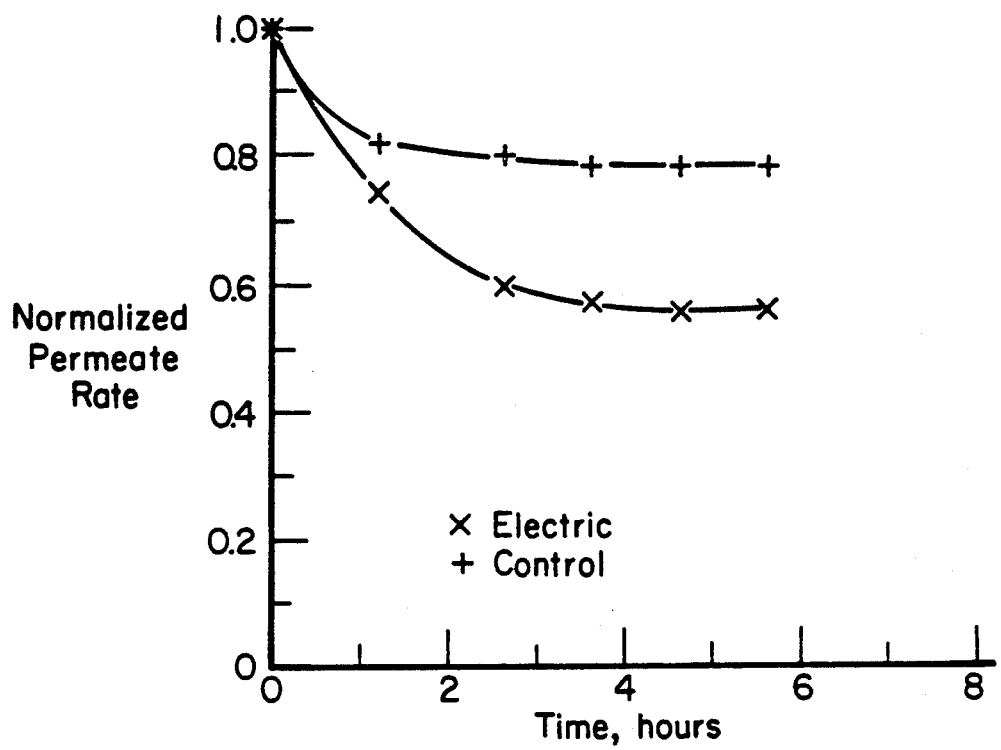

FIGS. 15 and 16 illustrate the effect on the normalized permeate (filtrate) rate of moving the electrode on the crossflow side of the membrane away from contact with the filter. The distance in FIG. 15 was about 0.038 inches and for FIG. 16 about 0.019 inches. Initial flow rate was 200 ml/min. The pressure differential across the membrane was about 10 psi. A control test of the same configuration but without the application of an electric field was also made. Data from both tests were normalized to allow easy comparison. As can be seen from FIGS. 15 and 16 moving the wire electrode a short distance away from the membrane gave the unexpected result that the control test without an electric field had a higher normalized permeate rate.

Figure 17:
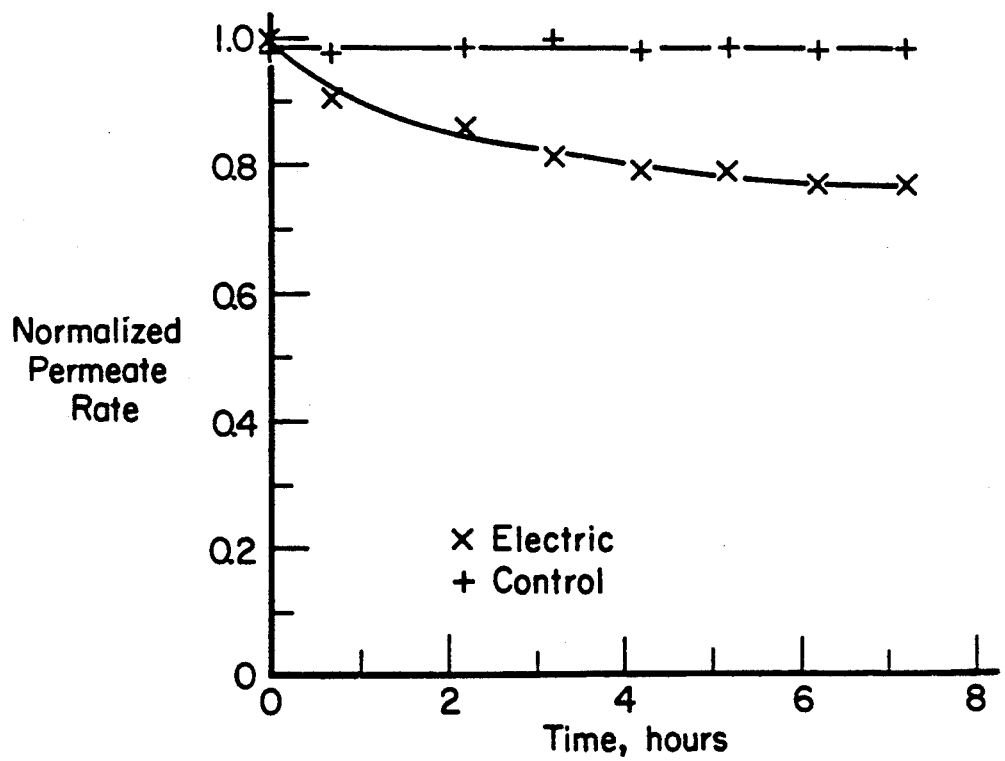
FIG. 17 is a graph that illustrates the effect when the electrode on the crossflow side of the filter is in contact with the filter, is an anode, and the particles in the fluid have a negative zeta potential.

FIG. 17 is a graph that illustrates the effect of having the electrode on the crossflow side of the filter act as an anode when the particles in the suspension have an negative zeta potential. The control, without an electric field, provides a better normalized permeate rate than when an electric field is applied. The cathode is spaced about 0.038 inches from filter 301. This confirms that the first electrode of FIG. 3 or 4 (301A or 401A) must be at the same polarity as the zeta potential of the suspension. That is, a suspension with a negative potential requires that the first electrode be at a negative potential, while a suspension with a positive zeta potential requires that the first electrode be at a positive potential. Other conditions are the same as for FIGS. 15 and 16.

Figure 18:
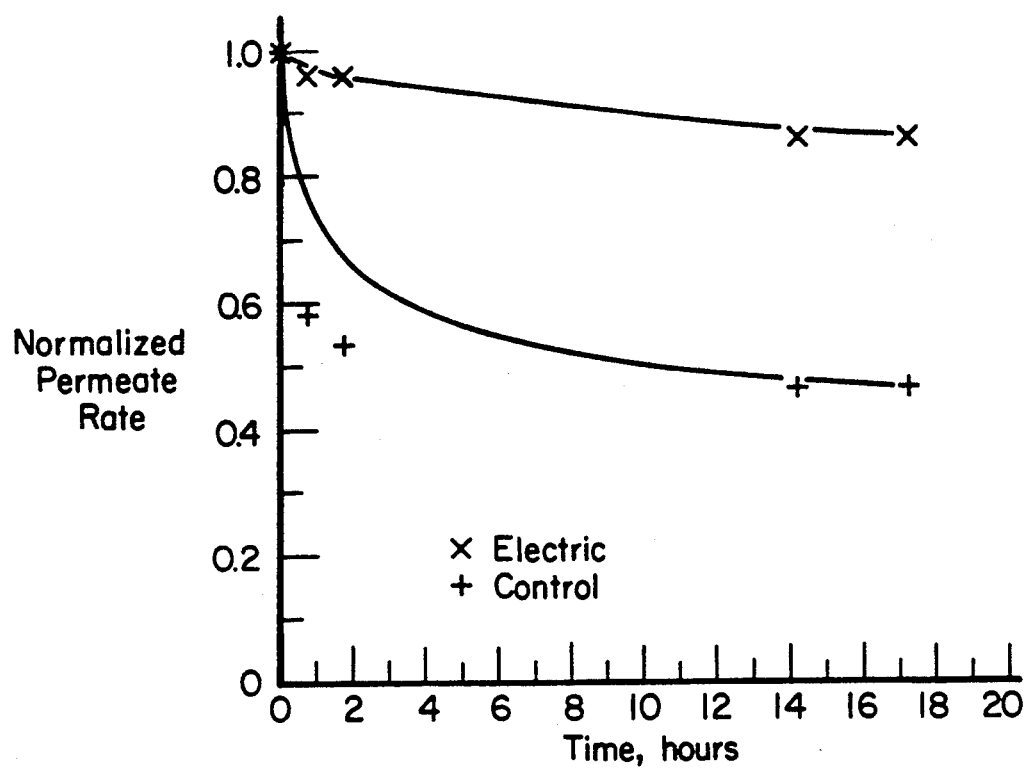
FIGS. 18 and 19 are graphs that illustrate the effect on the normalized permeate rate when the electrode on the crossflow side of the filter is in contact with the membrane is cathode, and the particles in the fluid have a negative zeta potential.
Figure 19:
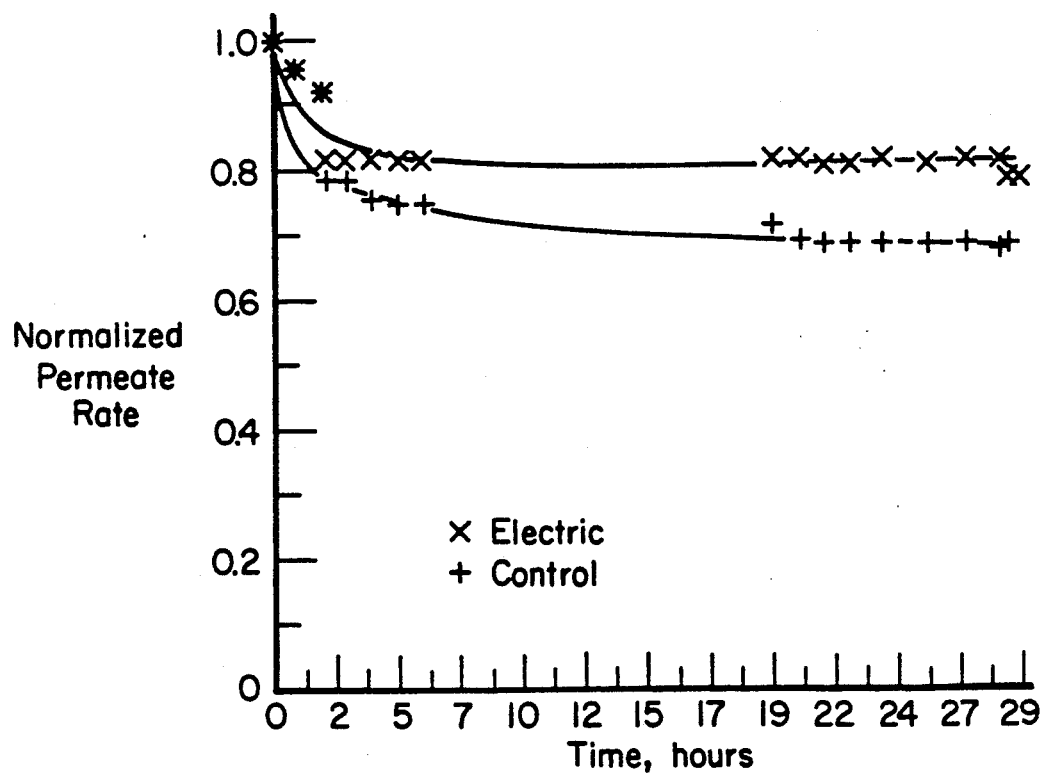

FIGS. 18 and 19 are graphs that illustrate the effect on the normalized permeate rate when the electrode on the crossflow side of the filter is in contact with the filter. The configuration for FIG. 18 is as in FIG. 4 where the electrode 401A is in contact with the filter 301 while electrode 402B is not. Electrode 402B is spaced apart from filter 301 by about 0.019 inches. The pressure across the filter was about 10-11 psi. The applied voltage was 50 volts at about 2.8 milliamps. FIG. 18 provides the surprising result that the normalized permeate rate for this applied electric field provides much better results than the control with no electric field applied.

The configuration of FIG. 19 is as in FIG. 3 where both electrodes 301A, 302B are in contact with the filter 301. The pressure across the filter was about 3-5 psi. The applied voltage was about 53 volts at about 7-8 milliamps. Again the advantage of the application of the electric field is apparent. Further, FIGS. 18 and 19 illustrate that when the electrode on the crossflow side of the filter 301 is in contact with the filter, then the other electrode does not need to be in contact with filter 301 in order to gain the benefits of the invention.

EXAMPLE 3

This example used A-13 streptomyces complex as the material to be filtered. Five liters of A-13 complex were freshly prepared by usual fermentation techniques. The cells are filamentous in nature. The material was used with the apparatus of FIG. 5. Pressure was 4 psi and feed rate 300 ml/minute, voltage was 30 volts with about 130 ma of current through the electrofilter. The membrane fouled very quickly with this material. After ten minutes, the rate of dewatering in the presence of an electric field is about 7 lb/ft$^2$/hr. The control using the same configuration but without the application of an electric field resulted in a rate of only 3 lb/ft$_2$/hr in the same time period. At the end of one hour, the dewatering rate in the presence of an electric field in configuration of the present invention was one and one half times that of the control. Fouling at the membrane can thus be controlled during broth concentration.

EXAMPLE 4

An experiment was performed where the electric field was on and then turned off for a time and then turned on again. Tap water was used for the experiment. The experiment was conducted for a total of 2.5 hours. Pressure used was 2.5 psi and feed rate was 200 ml/minute. Voltage was 40 volts and current was 0.2 ma.

The following results were noted. It takes approximately 0.5 hours for the flow rate to drop to the control level when the power is turned off. Once the membrane is fouled, the reapplication of the electric field does not totally eliminate the fouling on the membrane. For example, after the electric power had been turned off, reapplying the electric field cause the flow rate to increase from 310 to 315 lb/hr/ft$^2$; however, it did not increase to the initial 330 lb/hr/ft$^2$. The experiment further suggested that the entire membrane surface does not need to have a conductive layer thereon to control fouling; however there must be enough charge carriers in the feed to affect the interface.

EXAMPLE 5

Figure 14:
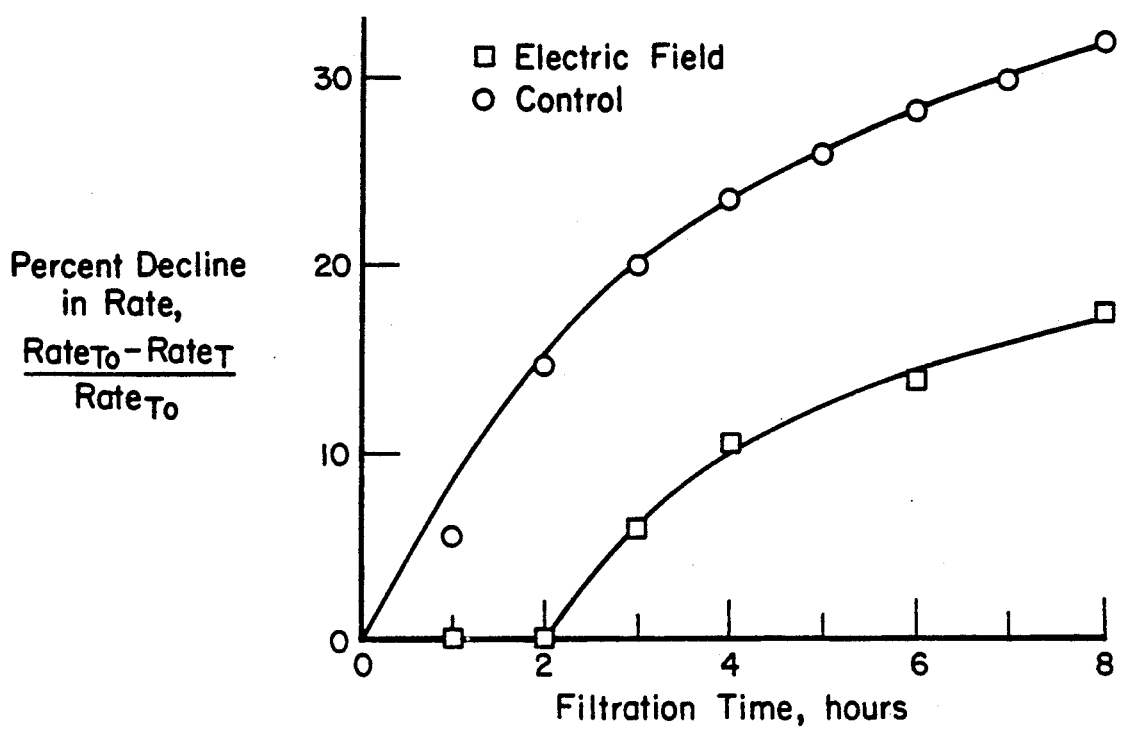
FIG. 14 is a graph showing the advantageous filtering of skim milk by the apparatus over a control.

An apparatus similar to FIG. 5 was used for the example. The filter was a 30,000 molecular weight cutoff ultrafiltration membrane. The suspension material was skim milk. Pressure was increased from 25 to 50 psi as the experiment progressed. Voltage similarly increased from 20 volts to 50 volts and the current from 50 to 60 ma. Results are shown in FIG. 14. The figure shows the percent decline in flow rate through the filter versus filtration time. The advantages of the invention are clearly demonstrated in that the decline in rate is substantially less with the use of the electrofilter.

EXAMPLE 6

In order to study the antifouling effect in the presence of an electric field the following test was performed. The plate of the Minitan ® unit was drilled to accept a Nikon 100× microscopic lens with a television camera attachment. Total magnification observable on the television screen was 4000×. This allowed the detailed observance of the crossflow surface of the filter.

The test sequence was as follows. First the filter surface was flushed with water. Then a suspension was allowed to flow with the electrofilter energized. Finally, the electric power was turned off while the suspension continued to flow. When the electrofilter was energized some individual particles deposited but did not agglomerate. In the absence of an electric field, the particles deposited and formed agglomerates on the surface of the filter at particular locations. The fouling behavior appeared to occur as nucleation or dendritic growth from a nucleating site. This test clearly demonstrated the advantages of the invention since the effects of the use of the field could be easily observed.

EXAMPLE 7

A latex suspension was tested as in Example 1. Pressures were 2-3 psi. Voltage was 40 volts and current was 170-200 ma. The experiment was conducted for a period of 7 hours. The electrofilter gave significant improvement over the control after this time. The electrofilter gave 40 percent more filtrate product than the control.

For proper application of the invention the suspension should first be tested for zeta potential by determining the zeta potential of the particles in the suspension, in order to determine proper electrode polarity and voltage.

All materials actually tested had a negative zeta potential. For these materials, the electrode in the crossflow chamber must be a cathode (negative polarity) and must be in physical contact with the filter. The other electrode is then the anode (positive polarity) and is located on the opposite side of the filter in the filtrate chamber. The anode may or may not be in contact with the filter.

If materials such as clays are in the suspension that result in the suspension having a positive zeta potential, then the electrode in the crossflow chamber must be the anode (positive potential) and must be in contact with the filter. The other electrode is then the cathode (negative polarity) and is located on the opposite side of the membrane in the filtrate chamber. The cathode may or may not be in contact with the filter.

It is thus apparent that the electrode in the crossflow chamber must always be in contact with the membrane. The electrode in the output chamber does not have to be in contact with the membrane but can be located to give the best flow rate for the apparatus.

Continuous removal of liquid from a dead-end chamber is also possible with the present invention. Use of a dead-end chamber is also known as batch processing. For convenience of discussion herein, the crossflow chamber will be understood to be a dead-end chamber when batch processing of liquids is used. In that case, removal of the concentrated suspension is not on a continuous basis as in the crossflow method. Mixing in the chamber may, however, optionally be used to provide for suspension flow past the electrofilter to enhance filtrate flow.

The invention further provides a method for continuously removing liquid from an aqueous suspension. The suspension may have small amounts of polar liquids other than water dispersed therein without adversely affecting the effectiveness of the method. These polar liquids include alcohols, acetones and the like.

The method for continuously separating a liquid from an aqueous suspension while reducing membrane fouling comprises providing a filtering apparatus having an electrofilter, as described above, disposed therein; determining the zeta potential of particles in the suspension; pumping the aqueous suspension into the filtering apparatus at a pressure adapted to cause flow of filtrate through the electrofilter; and concurrently with the pumping supplying electrical energy to the electrofilter at a polarity and at a voltage adapted to reduce fouling of the filter, whereby the first electrode has a negative potential when the zeta potential of the suspension is negative and a positive potential when the zeta potential of the suspension is positive. The additional steps of removing the aqueous suspension reduced in liquid content from the apparatus and removing filtrate from the apparatus complete the method. The additional step of recirculating at least a portion of the aqueous suspension reduced in liquid content to be pumped into the apparatus may be used to further reduce the liquid content. Alternatively two or more stages of the apparatus may be placed in series to achieve lower liquid levels. The process may be a batch or continuous crossflow process.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. A crossflow filter apparatus for continuously removing liquid from an aqueous suspension comprising:
   a. a filter housing;
   b. a filter disposed within the housing to form a crossflow chamber and filtrate chamber within the housing, wherein the filter is adapted to provide a flow of liquid filtrate from the crossflow chamber to the filtrate chamber at a rate above 0.01 gallon/psi/sq.ft.;
   c. a first electrode disposed on the crossflow chamber side of the filter so as to be in contact with the filter;
   d. a second electrode disposed on the opposite side of the filter;
   e. means for supplying an aqueous suspension containing particles to the crossflow chamber at one end of the chamber and means to remove a portion of the suspension depleted in liquid from another end of the crossflow chamber; and
   f. outlet means for removing filtrate from the filtrate chamber.

2. The apparatus of claim 1 further comprising means for supplying electrical energy to the electrodes.

3. The apparatus of claim 1 wherein the first electrode is a permeable structure bonded to the filter.

4. The apparatus of claim 1 wherein the filter is a polymeric membrane.

5. The apparatus of claim 1 wherein the second electrode is disposed in the filtrate chamber so as not to be in contact with the filter.

6. The apparatus of claim 1 wherein the first electrode comprises a strip disposed along the direction of flow of the suspension.

7. The apparatus of claim 1 wherein the first electrode comprises a plurality of strips disposed along the direction of flow of the suspension.

8. The apparatus of claim 1 further comprising a filter adapted to provide a flow of liquid filtrate above about 0.1 gallon/psi/hour/sq.ft.

9. The apparatus of claim 1 further comprising a filter adapted to provide a flow of liquid filtrate above about 1 gallon/psi/hour/sq.ft.

10. The apparatus of claim 1 further comprising a filter adapted to provide a flow of liquid filtrate above about 0.1 gallon/psi/day/sq.ft.

11. The apparatus of claim 1 further comprising:
   g. pumping means for providing pressure in the crossflow chamber so that filtrate flows through the filter.

12. A method for continuously separating a liquid from an aqueous suspension containing particles while reducing membrane or filter fouling comprising:
   a. providing a crossflow filter apparatus having;
      (1) a filter housing;
      (2) a filter disposed within the housing to form a crossflow chamber and filtrate chamber within the housing, wherein the filter is adapted to provide a flow of liquid filtrate from the crossflow chamber to the filtrate chamber;
      (3) a first electrode disposed on the crossflow chamber side of the filter so as to be in contact with the filter;
      (4) a second electrode disposed on the opposite side of the filter;
      (5) means for supplying an aqueous suspension to the crossflow chamber at one end of the chamber and means to remove a portion of the suspension depleted in liquid from another end of the crossflow chamber; and
      (6) outlet means for removing filtrate from the filtrate chamber;
   b. determining the zeta potential of particles in the aqueous suspension;
   c. pumping the aqueous suspension into the crossflow filter apparatus at a pressure adapted to cause flow of filtrate;
   d. concurrently with step c supplying electrical energy to the electrodes at a polarity and at a voltage adapted to reduce fouling of the filter, whereby the first electrode has a negative potential when the zeta potential of the suspension is negative and a positive potential when the zeta potential of the suspension is positive;
   e. removing the aqueous suspension reduced in liquid content from the apparatus; and
   f. removing filtrate from the apparatus.

13. The method of claim 12 further comprising the additional step of recirculating at least a portion of the aqueous suspension reduced in liquid content to the input of the filtering apparatus.

* * * * *